(12) United States Patent
Bremer

(10) Patent No.: US 9,176,299 B2
(45) Date of Patent: Nov. 3, 2015

(54) MONOLITHIC OPTICAL COMPONENTS WITH INTEGRATED FLEXURES

(71) Applicant: Zygo Corporation, Middlefield, CT (US)

(72) Inventor: Mark Bremer, Benicia, CA (US)

(73) Assignee: Zygo Corporation, Middlefield, CT (US)

( * ) Notice: Subject to any disclaimer, the term of this patent is extended or adjusted under 35 U.S.C. 154(b) by 20 days.

(21) Appl. No.: 14/179,196

(22) Filed: Feb. 12, 2014

(65) Prior Publication Data

US 2014/0226223 A1 Aug. 14, 2014

Related U.S. Application Data

(60) Provisional application No. 61/764,294, filed on Feb. 13, 2013.

(51) Int. Cl.
*G02B 7/02* (2006.01)
*G02B 7/182* (2006.01)
*G02B 7/00* (2006.01)

(52) U.S. Cl.
CPC *G02B 7/182* (2013.01); *G02B 7/02* (2013.01); *G02B 7/008* (2013.01)

(58) Field of Classification Search
USPC .................. 359/694–701, 811–830
See application file for complete search history.

(56) References Cited

U.S. PATENT DOCUMENTS

| 5,428,482 | A | 6/1995 | Bruning et al. | |
| 6,388,823 | B1* | 5/2002 | Gaber et al. | 359/819 |
| 6,646,779 | B2 | 11/2003 | Mumola et al. | |
| 2004/0212877 | A1 | 10/2004 | Borchard | |
| 2007/0067953 | A1 | 3/2007 | Vermeulen | |
| 2008/0204904 | A1* | 8/2008 | Mizuno | 359/811 |
| 2008/0204907 | A1 | 8/2008 | Blanding et al. | |
| 2008/0204908 | A1 | 8/2008 | Blanding et al. | |
| 2009/0207511 | A1* | 8/2009 | Schoeppach et al. | 359/822 |
| 2011/0317288 | A1 | 12/2011 | Bornschein | |

FOREIGN PATENT DOCUMENTS

| CN | 101652698 A | 2/2010 | G02B 26/08 |
| CN | 101657750 A | 2/2010 | G02B 7/02 |
| CN | 102265200 A | 11/2011 | G02B 7/02 |
| JP | 2005-316044 | 11/2005 | G02B 7/02 |
| JP | 2007-523295 | 8/2007 | F16C 11/04 |
| KR | 10-2006-0005393 | 1/2006 | G02B 17/08 |
| TW | 201034799 | 10/2010 | B25B 11/02 |

OTHER PUBLICATIONS

International Search Report and the Written Opinion of the International Searching Authority for International Application No. PCT/US2014/016068 dated May 28, 2014 (14 pages).

(Continued)

*Primary Examiner* — Mohammed Hasan

(74) *Attorney, Agent, or Firm* — Fish & Richardson P.C.

(57) ABSTRACT

An optical element includes a monolithic body portion, the monolithic body portion having an inner body portion, an outer body portion extending at least partially around the inner body portion, and exactly three flexural hinges connecting the inner body portion to the outer body portion. One of the inner body portion and the outer body portion defines an optical active portion configured to reflect, refract, or diffract light, and the other of the inner body portion and outer body portion defines a mount portion.

25 Claims, 11 Drawing Sheets

(56) References Cited

OTHER PUBLICATIONS

Taiwan Office Action for Taiwan Application No. 103104679 dated May 19, 2015.

Richard Fisher, Glass Flexure Mount Intellectual Property Search Rev 1, *Zygo Proprietary*, (Jul. 10, 2012) (2 pages).

International Preliminary Report on Patentability and Written Opinion for International Application No. PCT/US2014/016068 by Examiner Simon Baharlou dated Aug. 27, 2015 (11 pages).

* cited by examiner

MONOLITHIC OPTICAL COMPONENTS WITH INTEGRATED FLEXURES

CROSS-REFERENCE TO RELATED APPLICATIONS

This application claims priority from U.S. Provisional Application Ser. No. 61/764,294, filed on Feb. 13, 2013, which is incorporated herein by reference in its entirety.

BACKGROUND

Optical surface figure refers to the deviation of an actual optic surface shape from the ideal surface shape. Traditionally, in optical systems that require optical elements with low deviation from the ideal, the optical elements are held in place using flexure mounts. For example, an optical element may be bonded using an adhesive to a flexure portion of the mount, where the flexure is formed from a metal alloy, such as invar. This arrangement is designed to reduce stress in the optical element that would otherwise occur if the optical element were fixed directly to the mount. Specifically, the flexure mount arrangement is used to reduce distortion of the element's optical surface due to thermal or mechanical deformation of the underlying mounting structure (e.g., when translating the mount).

However, the flexure mount/alloy interface arrangement can still lead to stress in the optical element, including stress from imperfections in mating of the flexure to the mount, stress from minor misalignments of the components in assembly, stress from deformations associated with cure-shrinkage/instability of the bonding material (e.g., epoxy) used to bond the optical element to the flexure mount, and stress arising from the different thermal expansion coefficients of the materials used. Moreover, when mounting optical elements (e.g., mirrors) having a tight figure tolerance and high aspect ratios, the mounting stresses can easily exceed tolerable levels, causing the optical element to bend out of the specifications required for an intended system.

SUMMARY

The present disclosure relates to monolithic optical components with integrated flexures.

Various aspects of the disclosure are summarized as follows.

In general, in a first aspect, the subject matter of the disclosure can be embodied in an optical element that includes a monolithic body portion, the monolithic body portion having an inner body portion, an outer body portion extending at least partially around the inner body portion, and exactly three flexural hinges connecting the inner body portion to the outer body portion. One of the inner body portion and the outer body portion defines an optically active portion configured to reflect, refract, or diffract light, and the other of the inner body portion and the outer body portion defines a mount portion.

Implementations of the optical element can include one or more of the following features and/or features of other aspects. For example, in some instances, the exactly three flexural hinges enable the mount portion to be mounted to another part without degrading the optical performance of the optically active portion.

In some implementations, the inner body portion is the optically active portion, and the optically active portion is a mirror.

In some implementations, each of the exactly three flexural hinges extends substantially along a tangential direction with respect to the geometric center of the monolithic body portion. Each of the exactly three flexural hinges can extend along a direction within about 30 degrees of the tangential direction.

In some implementations, the inner body portion has a circular shape. In other implementations, the inner body portion has a non-circular shape.

In some implementations, each flexural hinge is separated from an adjacent flexural hinge by an elongated gap between the inner body portion and the outer body portion. At least one of the flexural hinges and at least one the elongated gaps may be arcuate in shape. At least one of the elongated gaps may have an arc length longer than an arc length of at least one of the flexural hinges. Each elongated gap may extend through a thickness of the monolithic body portion from a first surface of the monolithic body portion to an opposite second surface of the monolithic body portion. Each elongated gap may have a first end portion and an opposite second end portion, in which the first end portion of a first elongated gap overlaps the second end portion of an adjacent elongated gap in a radial direction. A first flexural hinge may be located between the first end portion of the first elongated gap and the second end portion of the adjacent elongated gap. A thickness of the first flexural hinge may be less than a thickness of the inner body portion and/or less than a thickness of the outer body portion. A top surface of the first flexural hinge may be recessed with respect to top surfaces of the inner body portion and the outer body portion, and/or a bottom surface of the first flexural hinge may be recessed with respect to bottom surfaces of the inner body portion and the outer body portion. The outer body portion may include a shelf portion integrally coupled to the first flexural hinge. The inner body portion may include an overhang portion integrally coupled to the first flexural hinge. The second end portion of each elongated gap may be radially offset from the first end portion of the elongated gap.

In some implementations, each of the exactly three flexural hinges extends substantially along a radial direction with respect to the geometric center of the monolithic body portion.

In some implementations, at least one flexural hinge has a thickness that is less than a thickness of the monolithic body portion.

In some implementations, a thickness of the monolithic body portion decreases or increases along a radial direction from a geometric center of the monolithic body portion.

In some implementations, the monolithic body portion is made of a material selected from the group consisting of: glass, metal, glass-ceramic matrix, ceramic, quartz, silicon, germanium, and beryllium.

In some implementations, the optically active portion is a lens or a mirror.

In some implementations, the optical element further includes a reflective layer on the monolithic body portion. The reflective layer may include multiple layers.

In some implementations, an aperture is located at a center of the inner body portion.

In some implementations, the outer body portion comprises three separate sections, in which each section is connected to a corresponding flexural hinge.

Certain implementations may have particular advantages. For example, the connecting portions of the optical element can inhibit stress originating in the outer body portion (e.g., as a result of mounting the optical element) from travelling to the inner body portion, where light is reflected, refracted, or diffracted. Moreover, because the monolithic body portion is uniformly composed of a particular material, stress that would otherwise arise in the inner body portion of the optical element due to a mismatch between differing thermal expansion coefficients of different materials can be minimized. By limiting the stress that travels to the inner body portion, deformations and/or motion of the inner body portion that would cause the surface of the optical element to deviate from an ideal can be reduced. Additionally, since the monolithic body portion is composed as a single contiguous component, no assembly of the body portion is required.

The details of one or more implementations are set forth in the accompanying drawings and the description below. Other features and advantages will be apparent from the description, drawings, and claims.

DETAILED DESCRIPTION

Figure 1A:
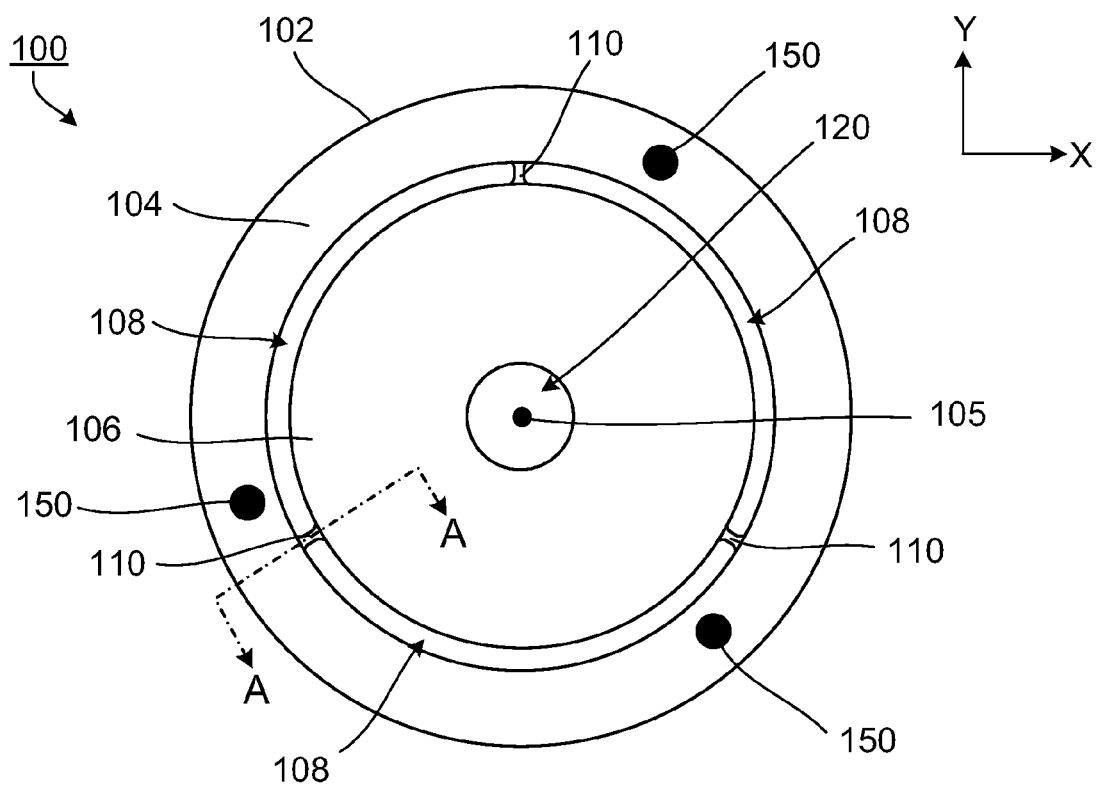
FIG. 1A is a schematic illustrating a plan view of an example of a stress-reducing optical element having integrated flexural hinges.

FIG. 1A is a schematic illustrating a plan view of an example of a stress-reducing optical element 100 that includes integrated flexures. A Cartesian coordinate system is shown for reference with the z-direction extending into and out of the page. The z-direction also extends parallel to the optical axis of the element 100. The optical element 100 may include an optical component such as, for example, a lens (e.g., a high precision lens), a mirror, a beam-splitter, a beam-combiner, a polarizer, a filter, or a prism, among others. The optical element 100 includes a body portion 102 composed of an outer body portion 104 and an inner body portion 106. In general, the inner body portion 106 includes the optically active portion of the optical element. That is, all or part of the inner body portion is configured to refract, reflect, or diffract light incident on the optical element. For example, in some cases, the inner body portion 106 is a mirrored surface configured to reflect incident light. In some implementations, the inner body portion 106 is a lens to refract incident light. The inner body portion 106 also may include an aperture 120 or other opening that allows an incident beam to pass through the optical element 100. In certain implementations, the outer body portion 104 defines a mounting portion for mounting the optical element 100 to a separate part, such as a mounting substrate.

As shown in FIG. 1A, the outer body portion 104 surrounds the inner body portion 106 and is coupled to the inner body portion 106 through three connecting portions/stress reducing structures 110. The stress reducing structures 110 are directly integrated in the material that forms the body of the optical element 100. For example, the material constituting the body portion 102 of the optical element 100 can be sculpted (e.g., through machining) to form the stress reducing structures 110, such that the body portion 102 (including the outer body portion 104, the inner body portion 106, and stress reducing structures 110) is a single contiguous component, i.e., the body portion 102 is monolithic. For example, the body portion 102 can be uniformly composed of a material such as glass (e.g., Zerodur® from Schott AG or ULE® glass from Corning), ceramic, metal, glass-ceramic matrix (e.g., CLEARCERAM® from Ohara Corp.), quartz, silicon, germanium, beryllium, or any other material suitable for use as an optical element.

The three stress reducing structures 110 serve to isolate the inner body portion 106 from stress originating in the outer body portion 104. When the outer body portion 104 is fixed, for example, to a mounting structure, stress that originates in the outer body portion 104, as a result of the mounting, does not pass to the inner body portion 106. Alternatively, the stress passing to the inner body portion 106 is minimized. Thus, even if the outer body portion 104 deforms when mounted, stress on the inner body portion 106 that exceeds tolerable levels can be avoided. As a result, the optical element 100 can be directly fixed to a mounting structure without deforming the part of the element 100, e.g., the inner body portion 106, that is used to interact with incident light (such as for reflection, transmission, or filtering). This can be especially useful for optical elements that have poor aspect ratios, i.e., having a width or length much greater than thickness (e.g., a width or length about 5 times greater than a thickness).

In some embodiments, the stress reducing structures 110 are referred to as "flexures" or "flexural hinges." For the purposes of this disclosure, a flexural hinge (or flexure) is an elastic and passive mechanical device that connects at least two different parts and that limits the transmission of stress between the different parts through bending or twisting. For example, each of the flexural hinges 110 shown in FIG. 1 connects the outer body portion 104 to the inner body portion 106, and allows relative motion of the two different parts of the monolithic body 102 through flexing of the hinge. Typically, a flexural hinge is compliant in one direction but relatively stiff in other orthogonal directions. As a result of bending, the flexural hinges 110 isolate the inner body portion 106 from mechanical and thermally induced forces generated on the outer body portion 104 and vice versa.

Figure 1B:
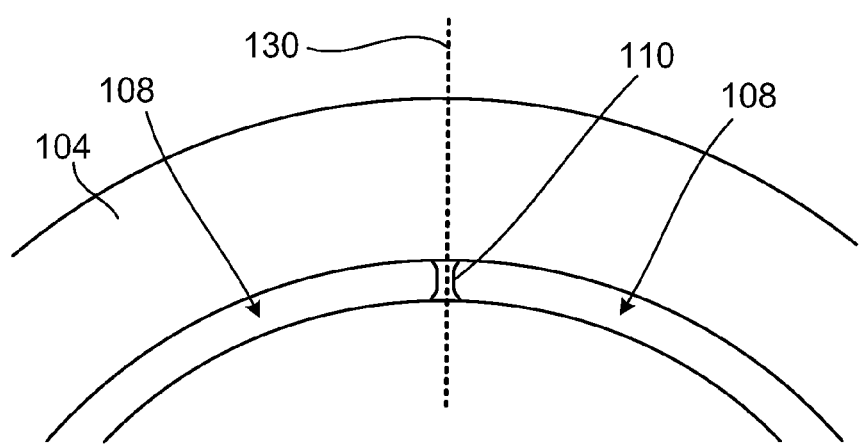
FIG. 1B is a schematic that illustrates a close-up view of a top surface of one of the flexural hinges of the optical element shown in FIG. 1A.

FIG. 1B is a schematic that illustrates a close-up view of a top surface of one of the flexural hinges 110 from FIG. 1A. A center of the hinge 110 along which the hinge twists and/or flexes is denoted by a dashed line 130. The flexural hinge 110 is designed to bend easily around the axis 130. The flexural hinge 110 essentially forms a pathway between the outer body portion 104 and the inner body portion 106 of the optical element 100. As shown in the plan view of FIG. 1B, the flexural hinge 110 covers a substantially uniform rectangular area between the inner body portion 106 and the outer body portion 104. The thickness of the hinge 110 extends into the page (i.e., along the z-direction).

To mount the optical element 100 to a mounting substrate, the optical element 100 can include optional holes 150 formed in the outer body portion 104 through which screws or other fastening components may secure the optical element to the mounting substrate. Other mounting approaches include, for example, mounting the optical element using mechanical clamps, where the clamp contacts and holds in place the outer body portion 104 to the mounting substrate.

Figure 2A:
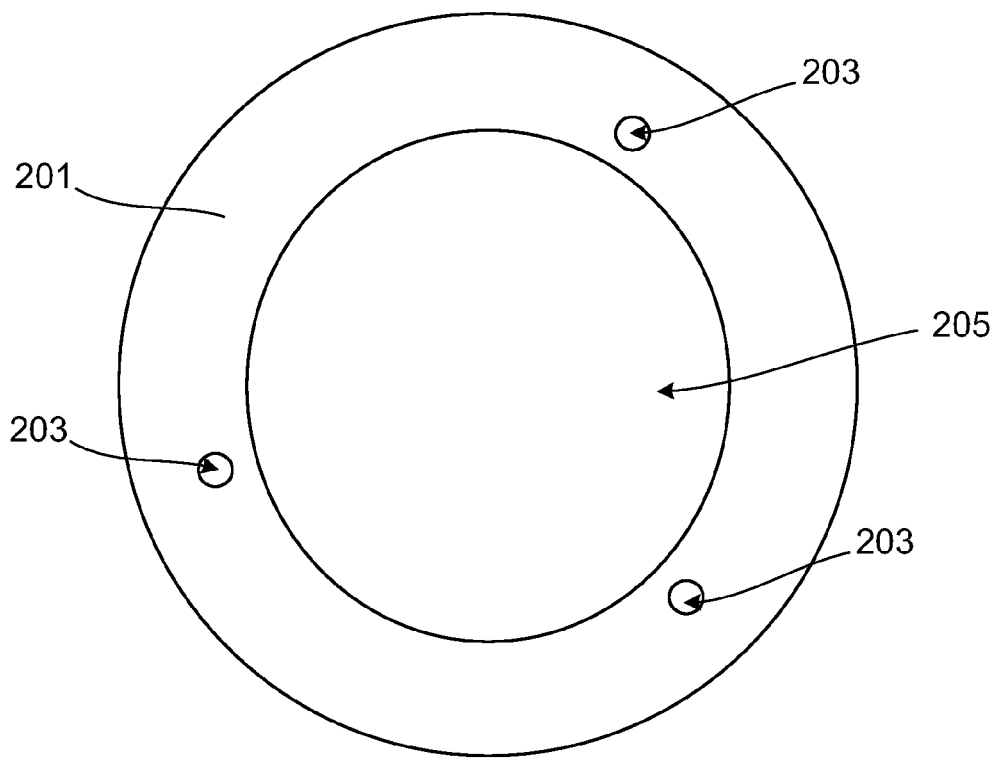
FIG. 2A is a schematic that illustrates a plan view of an example of a mounting substrate for mounting an optical element.
Figure 2B:
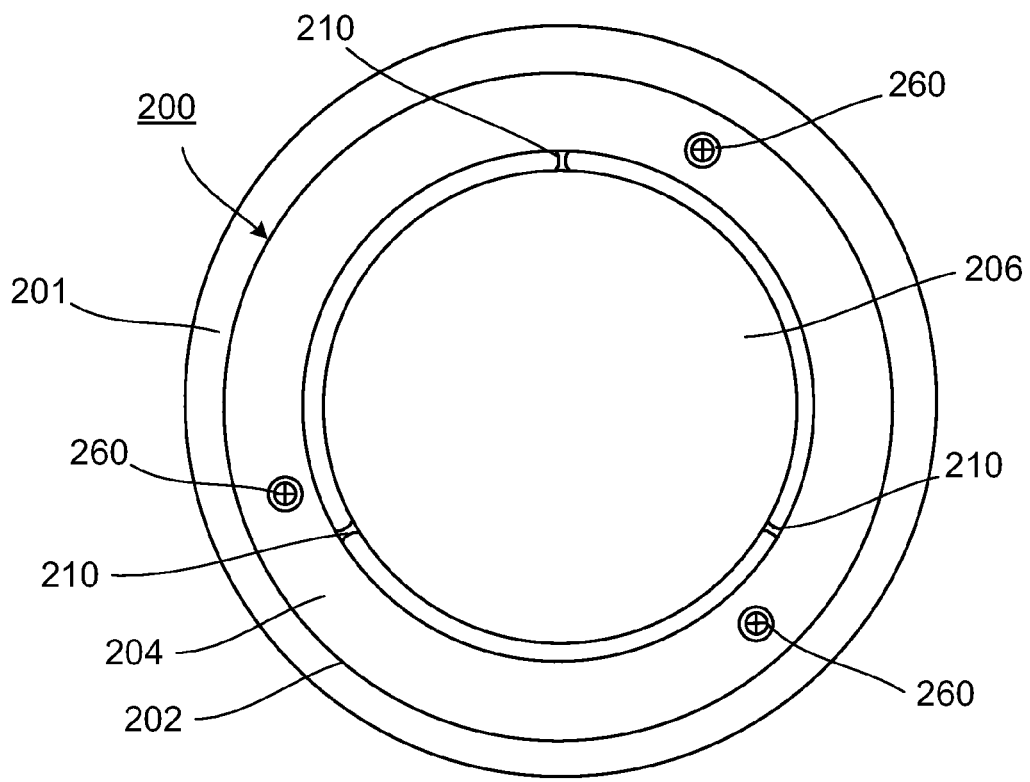
FIG. 2B is a schematic that illustrates a plan view of an optical element mounted to a mounting substrate.

FIG. 2A is a schematic that illustrates a plan view of an example of a mounting substrate 201 for mounting an optical element. The mounting substrate 201 includes multiple holes 203, for receiving fasteners to fasten an optical element to the substrate 201. In some implementations, the mounting substrate includes an opening 205 for allowing light to pass to and/or from the optical element mounted to the substrate. The substrate 201 can be formed of any material suitable for mounting the optical elements, such as Invar, aluminum, steel, or plastic. The substrate 201 is not limited to the circular in shape shown in FIG. 2A and can include any shape suitable for mounting an optical element. FIG. 2B is a schematic that illustrates a plan view of an optical element 200 mounted to a mounting substrate 201. The optical element 200 includes a monolithic body portion 202 having an outer body portion 204 and an inner body portion 206 connected together by three flexural hinges 210. As shown in FIG. 2B, fasteners 260 can be used to fasten the outer body portion 204 of the optical element 200 to the mounting substrate 201. In general, any standard opto-mechanical mounting device can be used to fasten the optical element to the mounting substrate. In other implementations, the outer body portion includes the optically active portion and the inner body portion is fastened to a mounting substrate (e.g., using one or more of the mounting techniques described above).

Mounting techniques such as clamping or fastening with screws do not always prevent the relative motion of optical elements with respect to the substrate, and may actually deform the optical element through mechanical stress. Moreover, optical elements may be susceptible to a change in shape due to the different coefficients of thermal expansion (CTE) of the mounting substrate and the optical element. With the use of integrated flexural hinges, however, deformation of the optically active portion of the optical element due to the foregoing adverse factors can be minimized. For example, when the dimensions of the mounting substrate and the material forming the outer body portion (which is mounted to the mounting substrate) change with temperature (due to CTE mismatch), the flexural hinges absorb stress arising in the outer body portion by bending, and thus limit the stresses experienced by the inner body portion. When the stresses subside, the flexural hinges return to their original non-stressed position. Thus, the flexural hinges enable the mount portion (e.g., the outer body portion) of the optical element to be mounted to another part without degrading the optical performance of the optically active portion of the optical element. For example, in some implementations, the hinges limit degradation of the optical surface figure to less than about 25% of a specified optical surface figure, less than about 20% of a specified optical surface figure, less than about 15% of a specified optical surface figure, less than about 10% of a specified optical surface figure, or less than about 5% of a specified optical surface figure. Furthermore, since the hinges are formed of the same material as the inner and outer body portions, and are integrated as one body, stress-induced deformations that would otherwise arise due to CTE mismatch between the inner and outer body portions are eliminated.

Referring again to FIG. 1A, the flexural hinges 110 are arranged in what is called a "radial" orientation. That is, each of the three flexural hinges extends substantially along a radial direction with respect to the geometric center 105 of the monolithic body portion 102. Each flexure also is stiff in the radial direction, but relatively compliant around an axis that extends through a center of the flexure in the radial direction (i.e., an axis that extends from the inner body portion 106 to the outer body portion 104). That is, the flexure can twist around the radially extending axis. Thus, each hinge may exhibit a limited amount of twisting movement relative to the inner body portion 106 and the outer body portion 104. Additionally, the flexural 110 hinges are arranged approximately equidistant from one another. By arranging exactly three hinges in this manner, motion of the inner body portion 106 or outer body portion 104 can be constrained and the transmission of stress between the inner and outer body portions can be limited. In contrast, with fewer hinges, the inner body portion 106 may experience substantial movement, thus shifting the position of the optical element. For example, with two flexural hinges, the optical element would pivot and oscillate on an axis between the two hinges. With more than three hinges, the inner body portion 106 would be over-constrained and the hinges may not have sufficient compliance to absorb stresses originating in the outer body portion 104.

Figure 3:
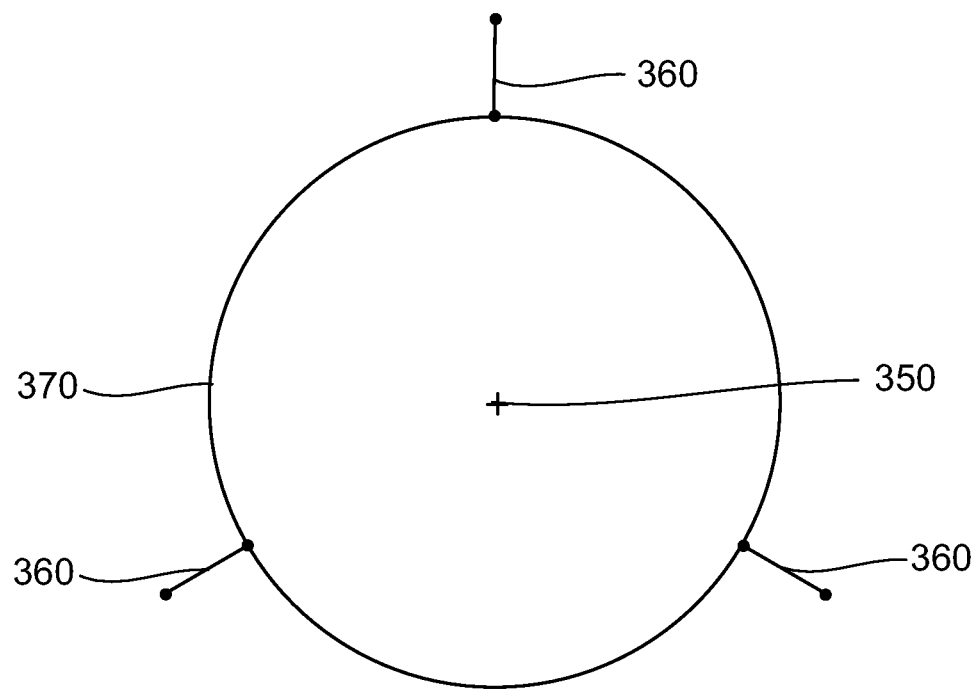
FIG. 3 is a schematic illustrating an outline of a flexural hinge oriented in a radial configuration.

The "radial" orientation of flexural hinges is also illustrated in FIG. 3. In particular, FIG. 3 is a schematic illustrating an outline of three flexural hinges, each arranged so that an elongated portion extends along a radial direction between an inner body portion and an outer body portion of a stress-reducing optical element. As shown in FIG. 3, each line 360 represents the length of a flexural hinge arranged parallel to a line extending outwardly from a geometric center 350 of an optical element. The circle 370 is shown in FIG. 3 to aid illustration of the flexure orientation and does not necessarily represent an object or structure in an actual optical element.

Referring again to the example shown in FIG. 1A, each flexural hinge 110 is separated from an adjacent flexural hinge by an elongated gap 108. The elongated gap 108 is an opening in the body portion 102 that extends between flexural hinges 110 and provides physical separation of the outer body portion 104 from the inner body portion 106. The shorter sides of the elongated gap 108 extend along directions that travel outwardly from the center of the optical element 100 (i.e., the radial direction).

Figure 1C:
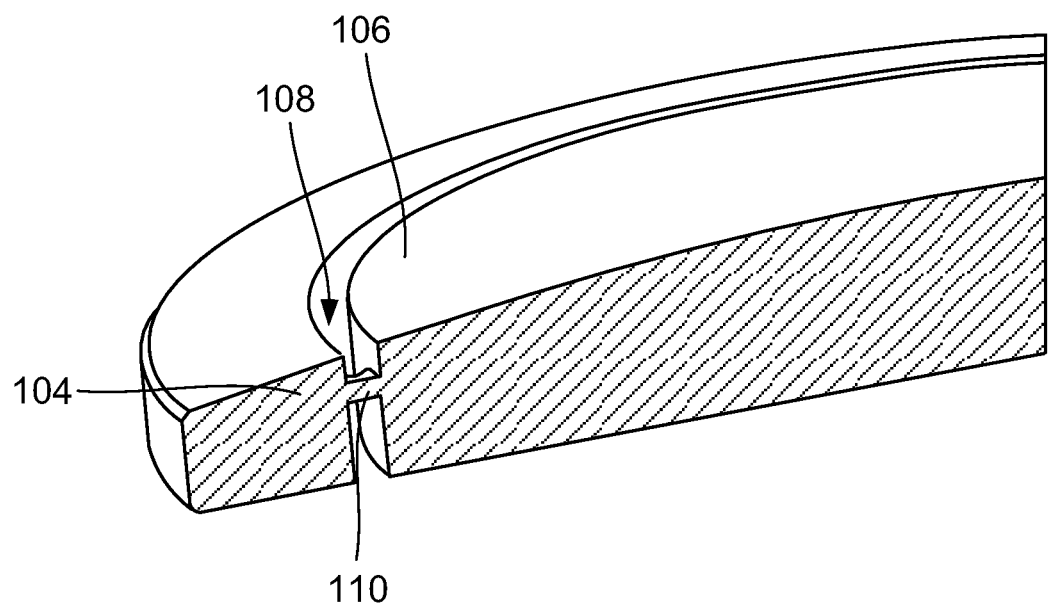
FIG. 1C is a schematic that illustrates a cut-away view of the optical element shown in FIG. 1A.

The openings of the elongated gaps 108 extend entirely through a thickness of the monolithic body portion 102. That is, the openings extend from a top surface of the monolithic body portion 102 to a back surface of the monolithic body portion 102. FIG. 1C is a schematic that illustrates a cut-away view of the optical element 100 at section A-A of FIG. 1A, in which the depth of the gap through the entire thickness of the optical element can be seen. By forming the gaps to extend through the entire thickness of the monolithic body portion 102, stress originating in the outer body portion 104 can be restricted to reaching the inner body portion 106 only through the hinges 110.

FIG. 1A also shows that the flexural hinges 110 and elongated gaps 108 are arranged in a ring positioned between the outer body portion 104 and the inner body portion 106. The ring including the elongated gaps 108 and flexural hinges 110 can be a circular pattern (as shown in FIG. 1A). Alternatively, the ring including the elongated gaps 108 and flexural hinges 110 can have other shapes, such as elliptical, rectangular, or square, among others.

In some implementations, one or more of the elongated gaps 108 are arcuate in shape. That is, the elongated gaps 108 are shaped like a bow, curve, or incomplete annular slot, such as the gaps 108 shown in FIG. 1A. However, the elongated gaps 108 do not have to be curved and can take on other shapes. For example, the elongated gaps 108 can be substantially straight lines. In some implementations, the elongated gaps 108 have portions that are narrow and portions that are relatively wide in comparison. In some cases, the elongated gaps 108 have portions that extend along a first direction and other portions that extend along different directions, such as, for example "S" shaped elongated gaps 108. In principle, the elongated gaps 108 can include any shape that can be manufactured in the monolithic body portion 102.

The monolithic body portion 102 may have a uniform thickness such that the thickness (as determined along the z-axis) of the inner body portion 106 is the same as the thickness at the outer body portion 104. In other implementations, the thickness of the monolithic body portion is non-uniform. For example, in some cases, the thickness of the monolithic body portion 102 is greatest at or near the center of the optical element 100 and decreases (e.g., either monotonically or otherwise) radially out from the center, such that at least a top surface (and/or bottom surface) of the optical element 100 exhibits a convex shape. Alternatively, the thickness at the center of the optical element 100 can be a minimum and can gradually increases along a radial direction from the center such that at least a top surface (and/or bottom surface) exhibits a concave shape. In some cases, the thickness of at least one of the flexural hinges 110 is the same as the thickness of the outer body portion 104 and/or the inner body portion 106. In certain implementations, the thickness of at least one of the flexural hinges 110 is different from the thickness of the inner body portion 106 and/or the outer body portion 104. For example, the flexural hinge 110 can be thinner than either the outer body portion 104 or the inner body portion 106. In some cases, the flexural hinge 110 is fabricated to have a different thickness from the inner and/or outer body portions by machining the area where the flexural hinge 110 is located from the front and/or back of the monolithic body portion 102.

The area, as measured in the x-y plane of FIG. 1A, and/or volume occupied by hinges 110 relative to the area and/or volume occupied by the gaps between the hinges 110 may vary. For example, in some implementations, the area (volume) of the hinges is about equal to the area (volume) occupied by the gaps. Alternatively, as shown in FIG. 1A, the area (volume) occupied by the hinges 110 is much less than the area (volume) occupied by gaps 108. For example, the area (volume) occupied by the hinges may be 1/3 of the area (volume) occupied by the gaps, 1/4 of the area (volume) occupied by the gaps, 1/6 of the area (volume) occupied by the gaps, 1/10 of the area (volume) occupied by the gaps, or 1/20 of the area (volume) occupied by the gaps. If the flexural hinges 110 are too narrow, the hinges 110 may be susceptible to breakage. The optical element 100 may have the following exemplary dimensions: a diameter (measured in the x-y plane) of about 150 mm; a flexural hinge cross-sectional area (where the depth is measured along the z-axis) of about 12 mm$^2$; a width (measured in the x-y plane) of an elongated gap of about 2 mm; and an average thickness of the optical element (as measured in the z-direction) of about 12 mm.

The flexural hinges used in the stress-reducing optical elements are not limited to the shape shown in FIG. 1A and can have other configurations. For example, in some implementations, the flexural hinge includes a slender waist region at its geometric center to enhance bending in the compliant direction. That is, the hinge can be wider at regions where the hinge meets the inner body portion and outer body portion, and narrower in between. Alternatively, the hinge length can decrease or increase (monotonically or otherwise) from the inner body portion to the outer body portion. Other shapes are also possible.

Figure 4:
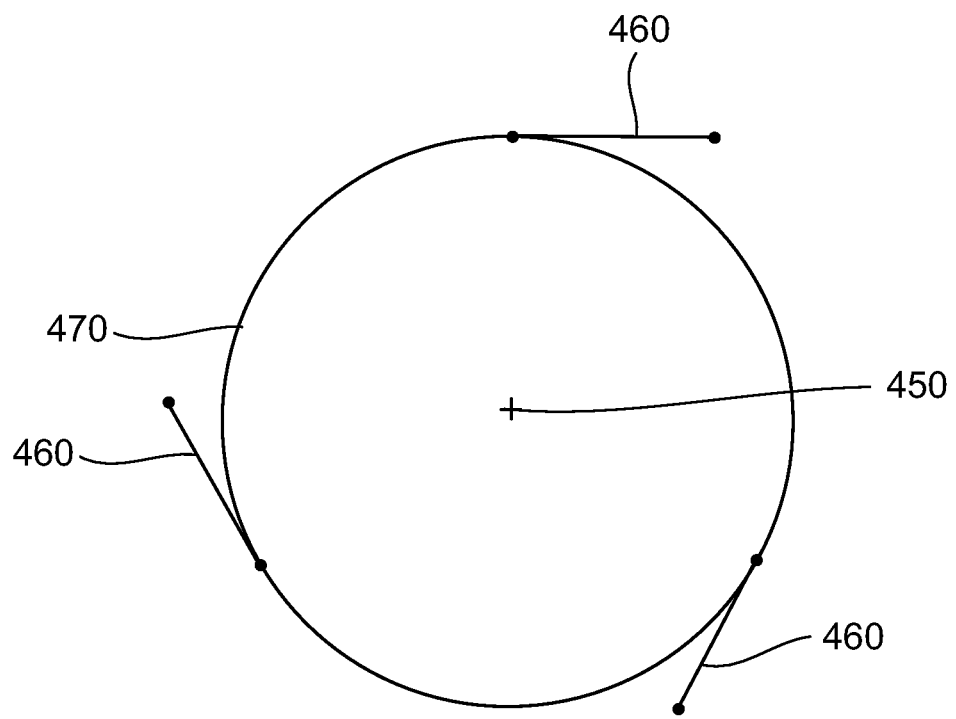
FIG. 4 is a schematic illustrating an orientation of a flexural hinge arranged in a tangential configuration.

Flexural hinges also can be arranged in what is called a "tangential" orientation. That is, each of the three flexural hinges has an elongated portion that extends substantially tangential with respect to a circle whose center is the same as a geometric center of the optical element/the monolithic body portion. The circle to which the hinges are tangent is not necessarily an actual physical component of the optical element but may include a fictional circle for determining the orientation of the hinges. FIG. 4 is a schematic illustrating an orientation of a flexural hinge arranged in a tangential configuration between an inner body portion and an outer body portion of a stress-reducing optical element. Circle 470 is shown to aid illustration of the flexure orientation and does not necessarily represent an object or structure in an actual optical element. As shown in FIG. 4, each line 460 represents a flexural hinge arranged tangentially with respect to a different point on circle 470 having a geometric center 450. A short-hand expression for this arrangement is that the flexures represented by lines 460 are arranged tangentially with respect to the geometric center 450.

The tangential configuration allows the flexure hinges to be much longer than in the radial configuration without requiring the removal of a significant amount of material from the outer body portion and/or the inner body portion. For example, a flexural hinge having the same length as the hinge 460, but arranged in a radial configuration, would require a significant reduction of material in the outer and/or inner body portion to accommodate the increased length. Furthermore, the increased length that can be obtained in the tangential configuration allows for a greater cross section of the flexural hinge, which, in turn, increases the hinge structural strength without sacrificing flexibility.

Figure 5A:
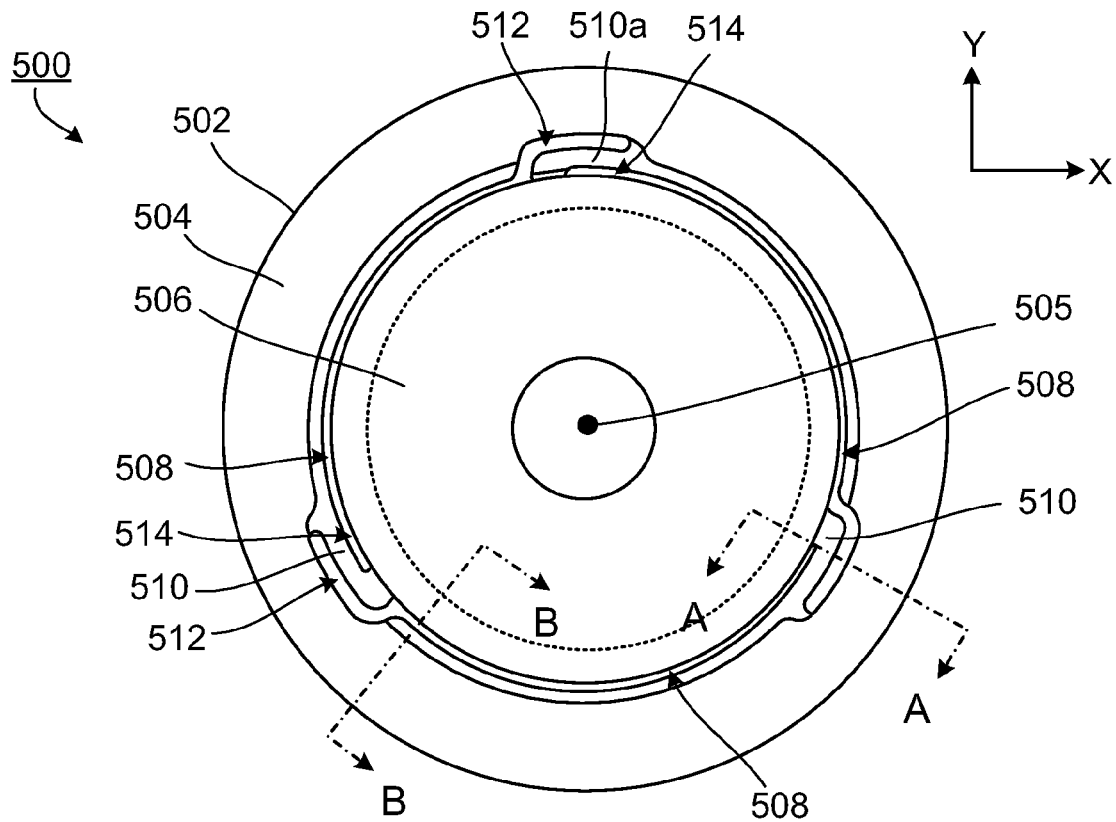
FIG. 5A is a schematic illustrating a plan view of an example of a stress-reducing optical element having integrated flexural hinges.

An example of a stress-reducing optical element 500 that includes a tangential flexural hinge configuration is shown in FIG. 5A. FIG. 5A is a schematic illustrating a plan view of the optical element 500. The optical axis is parallel with the z-direction into the page. The optical element 500 includes a monolithic body portion 502 having an outer body portion 504 integrally connected to an inner body portion 506 by three flexural hinges 510. The optically active area of the inner body portion 506 is defined by the dashed circle in this example, though differently defined areas also may be used as the optically active area. The flexural hinges 510 are elongated in a tangential configuration, i.e., in a direction that is substantially tangential to a circle whose center is the same as the geometric center 505 of the optical element 500. The hinges 510 are relatively compliant in the radial directions and the z-direction and stiff in directions that are orthogonal to the radial and z-directions (i.e., the tangential directions). As a result, the hinges 510 substantially maintain the inner body portion 506 fixed in the x-y plane. The flexibility of the hinges 510 is primarily along the z-direction, which translates deformation in the outer body portion 504 into tip, tilt, or motion of the inner body portion 106 along the z-direction (solid body motion), without causing excessive optical surface figure error. The inner body portion 506 is otherwise substantially fixed by the hinges 510 in the x-y plane. As with radially configured flexural hinges, the hinges 510 are arranged substantially equidistant from one another around the geometric center 505 of the monolithic body portion 502. By arranging exactly three hinges in this manner, the inner body portion 506 can be constrained to a small amount of tip, tilt, or motion along the z-direction. In contrast, with fewer hinges, the inner body portion 106 may experience substantial movement, thus shifting the position of the optical element. On the other hand, if more than three hinges are used, the inner body portion 506 will be over-constrained and the hinges may not have sufficient compliance to absorb stresses originating in the outer body portion 504.

The elongated gaps 508 that separate adjacent flexural hinges 510 and the hinges themselves are arranged in a ring around the center 505 of the monolithic body portion 502. Each elongated gap 508 includes a first end 512 and an opposite second end 514. In the present example, the first end 512 of each elongated gap 508 partially overlaps the second end 514 of an adjacent elongated gap 508 in the radial direction. The flexural hinges 510 are located in the regions between the overlapping portions of the elongated gaps 508, in which a first side of the flexural hinge 510 is integrally connected to the inner body portion 506 and a second opposite side of the hinge 510 is integrally connected to the outer body portion.

Figure 5B:
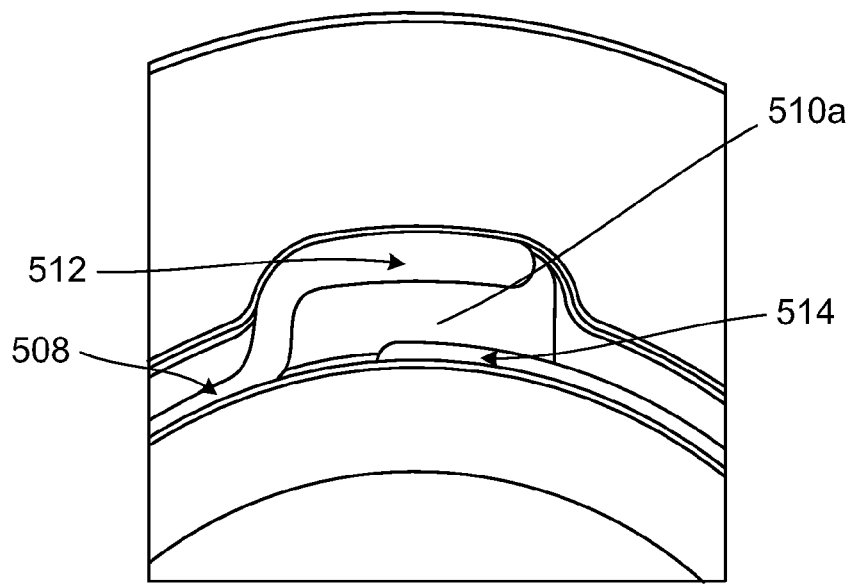
FIG. 5B is a schematic that illustrates a close-up view of a flexural hinge from the optical element shown in FIG. 5A.

In the present example, the first end 512 of the opening that forms the gap 508 deviates from an arc into a "dog leg" shape in the region where the flexural hinge 510 is located. FIG. 5B is a schematic that illustrates a close-up view of the flexural hinge 510a from FIG. 5A. To achieve the same level of isolation for the inner body portion 506 that can be obtained with tangential flexures 510, a radial flexure would have to be either very thin or much longer in the radial direction compared to the radial span of the tangential flexural hinge 510. A flexural hinge that is too thin would leave the hinge more susceptible to breakage during processing, handling and shipping. Additionally, a flexural hinge that is longer in the radial direction requires a larger outer body portion or smaller inner body portion to accommodate the increase in hinge length. In applications where availability of space is a design constraint, the tangential flexural hinge advantageously provides improved flexibility while sacrificing less area than a radially oriented flexural hinge and with better structural integrity.

The flexural hinges 510 do not need to extend along a perfect tangent with respect a circle whose center is the same as the center 505 of the monolithic body portion 502. As shown in FIGS. 5A and 5B, the hinges 510 actually have a slight curvature that follows the circular shape of the inner body portion 506 (e.g., along the azimuth), such that the hinges extend in a substantially tangential direction with respect to the geometric center 505 of the monolithic body portion 502. In some implementations, a flexural hinge that is substantially tangent extends along a direction within about 30 degrees of a tangent to a circle whose center is the same as the geometric center of the optical element. Alternatively, in some implementations, the flexural hinges are arranged at an angle between a radial configuration and a substantially tangential configuration. For example, in some implementations, each of the exactly three flexural hinges extends along a direction that is greater than about 30 degrees from the tangential direction and less than 90 degrees from the tangential direction (e.g., an elongated portion of the hinge extends along a direction that is about 45 degrees from the tangential direction). In some implementations, the flexural hinges are arranged in a substantially radial configuration (e.g., the elongated portions of the hinges extend along a direction that is within about 30 degrees from the radial direction).

To further enhance the stress reducing capabilities of the optical element, the flexural hinges may be positioned in the z-direction (e.g., into and out of the page in the coordinate systems shown in FIGS. 1A, 2A, and 5A) so that the sectional centers of the flexural hinges are nominally in the neutral plane of the optical element, i.e., the plane corresponding to a center of mass of the optical element. The neutral plane is the location where the loads applied to the outer edge of the optical element will have the least impact on shape. Centering the hinges at the neutral plane also improves response to vibration. By keeping the center of mass between the connection points, the natural frequency of the hinge is kept as high as possible. Furthermore, by placing the flexural hinges nominally at the neutral plane, motion of the inner body portion caused by movement of the outer body portion (global body motion) also can be minimized.

Figure 5C:
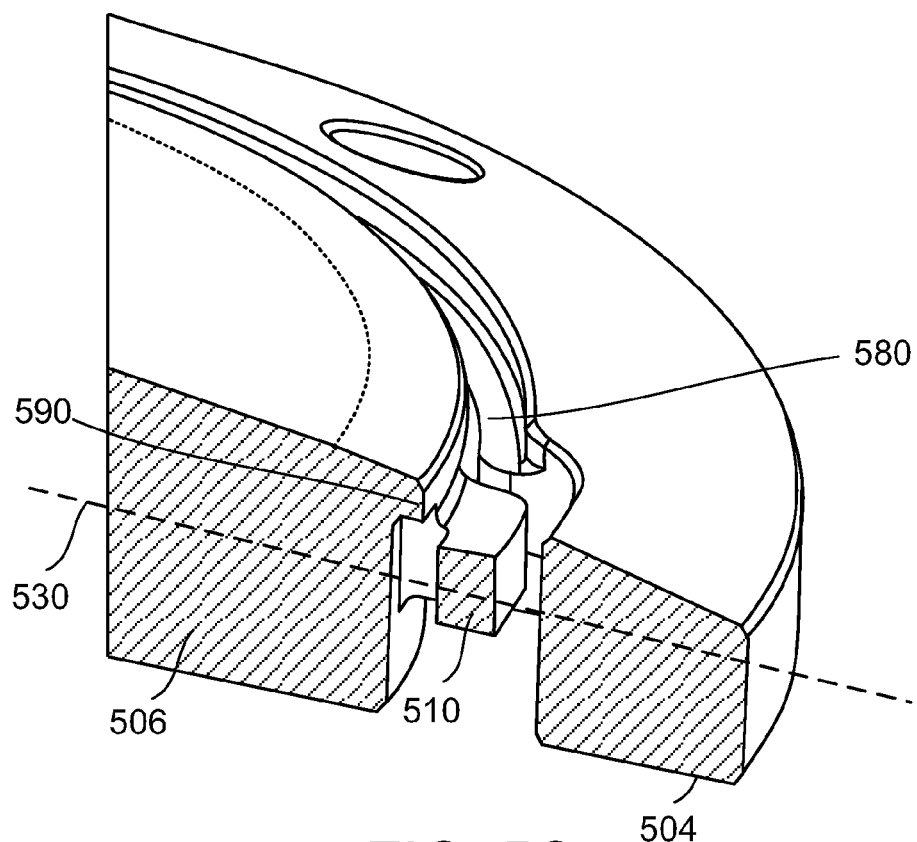
FIG. 5C is a schematic that illustrates a perspective view of section A-A of FIG. 5A.

FIG. 5C is a schematic that illustrates a perspective view of section A-A of FIG. 5A. As shown in FIG. 5C, the flexural hinge 510 is centered approximately at the neutral plane of the optical element 500 (identified by dashed line 530). In addition, the thickness of the flexural hinge 510a is less than the thickness of the inner body portion 506 and the outer body portion 504 of the optical element 500. An advantage of making the flexural hinge 510 thinner than the inner and/or outer body portion is that the flexural hinge will be softer and thus bend easier. At the same time, however, thinning the flexural hinge may make the hinge more susceptible to breakage.

Figure 5D:
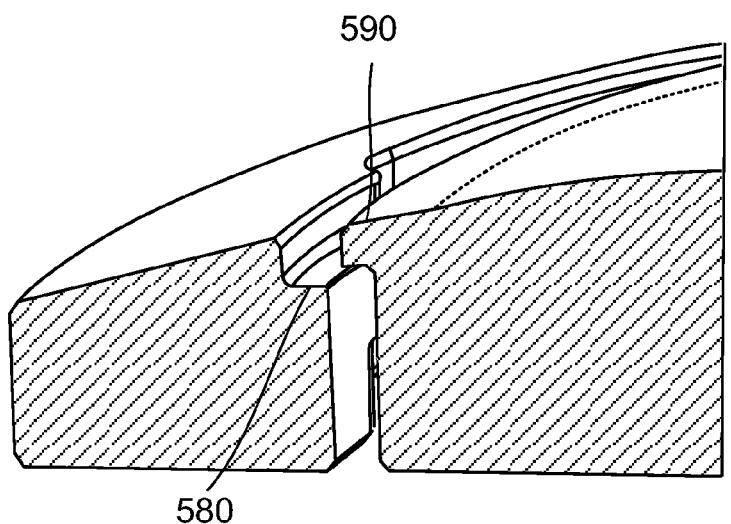
FIG. 5D is a schematic that illustrates a perspective view of section B-B of the optical element of FIG. 5A.

The design of the elongated gaps 508 and flexural hinges 510 may be altered in other ways, as well. For example, as shown in FIG. 5C, a top surface of the flexural hinge 510 may be in the same plane as a shelf 580 formed on the outer body portion 506. In this example, the shelf 580 is a protruding edge and may be formed by removing material from the outer body portion 504 to a fixed depth starting from the top surface of the optical element 500. Similarly, a ledge 590 may be formed on the inner body portion 506. An example of the ledge 590 is shown in FIGS. 5C and 5D. FIG. 5D is a schematic that illustrates a perspective view of section B-B of the optical element 500 of FIG. 5A. The ledge 590 may be formed by removing material from the inner body portion 506 to a fixed depth starting from the backside of the optical element 500. The formation of the ledge 590 and/or shelf 580 may assist mounting the optical element 500 in certain implementations. As illustrated in both FIGS. 5C and 5D, the front and back side slots that form the ledge 590 and shelf 580 are slightly different diameters. This allows the material from the inner body portion 506 and the outer body portion 504 to be removed while still leaving the openings wide enough for reasonably standard machining processes. The grooves forming the ledge 590 and the shelf 580 break through into one another forming the elongated gap 508 (i.e., so that the gap extends continuously from the front side to the back side of the monolithic body portion), while the profile of each groove is a full circle.

The flexural hinges 510 shown in FIGS. 5A-5D may have the following exemplary dimensions: a cross-sectional area (measured in the z-x plane) of about 16 $mm^2$; a flexural hinge length (measured in the x-y plane) of about 16 mm.

Figure 6:
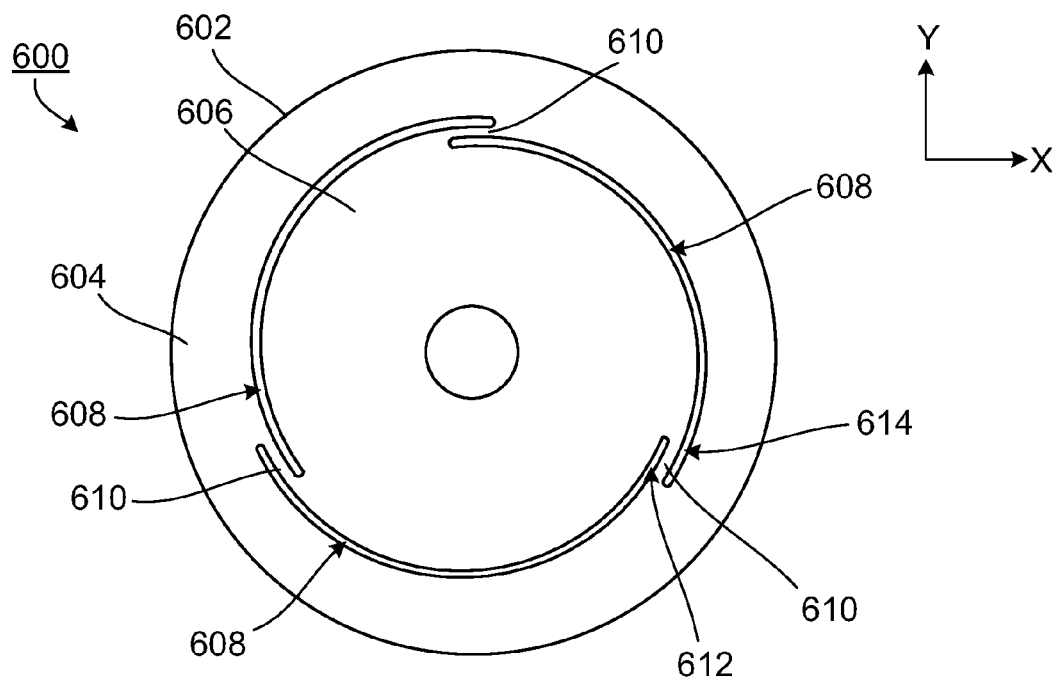
FIG. 6 is a schematic that illustrates a plan view of an example of a stress-reducing optical element having integrated flexural hinges.

Other tangential flexural hinge designs are also possible. FIG. 6 is a schematic that illustrates a plan view of an example of a stress-reducing optical element 600 that employs three flexural hinges 610 in another tangential configuration. The optical element 600 includes a monolithic body portion 602 composed of an outer body portion 604 connected to an inner body portion 606 through the flexural hinges 610. The elongated gaps 608 that separate adjacent flexural hinges 610 and the hinges themselves are arranged in a ring around a center of the monolithic body portion 602. Each elongated gap 608 includes a first end 612 and an opposite second end 614. In the present example, the second end 614 of each elongated gap 608 partially overlaps the first end 612 of an adjacent elongated gap 608 in the radial direction. A flexural hinge 610 is located in the region between the overlapping portions of the elongated gaps 608, in which a first side of the flexural hinge 610 is integrally connected to the inner body portion 606 and a second opposite side of the hinge 610 is integrally connected to the outer body portion.

Figure 7:
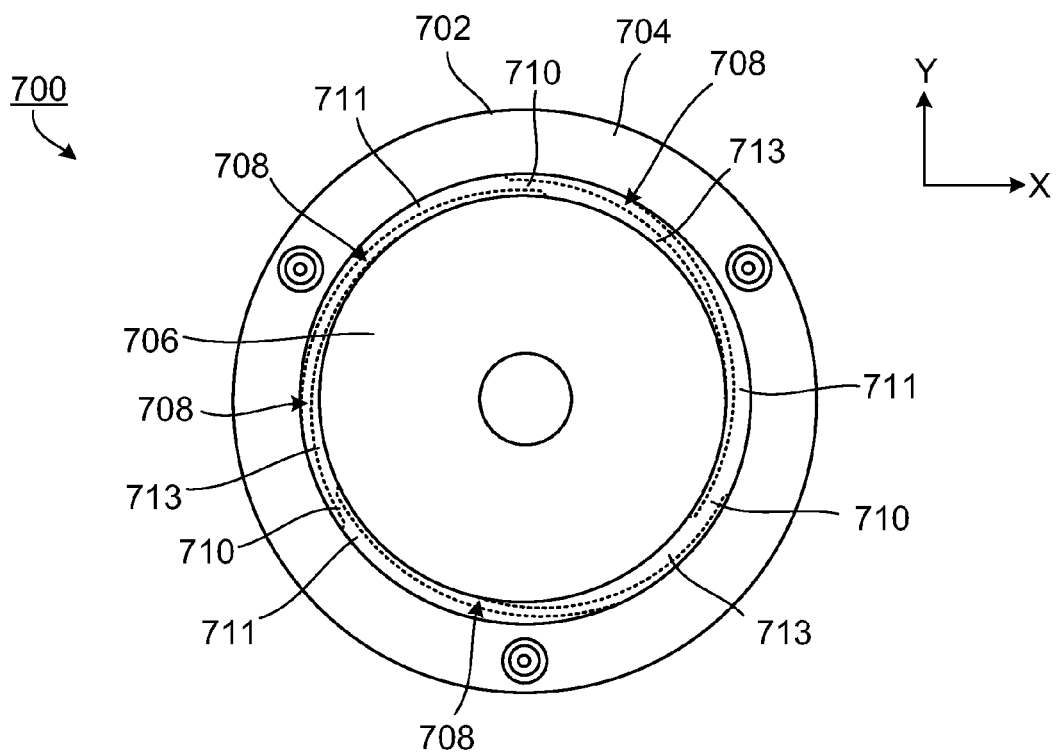
FIG. 7 is a schematic that illustrates a plan view of a stress-reducing optical element having integrated flexural hinges.

Various modifications can be made to the design shown in FIG. 6. For example, the elongated gaps 608 can be substantially straight instead of curved or the gap width can be non-uniform over the length of the gap 608 (as opposed to the constant width over the arc length of gap 108 shown in FIG. 1A). Alternatively, or in addition, the flexural hinge extends substantially around the inner body portion. For example, FIG. 7 is a schematic that illustrates a plan view of an example of a stress-reducing optical element 700 having a monolithic body portion 702 composed of an outer body portion 704, an inner body portion 706, and three flexural hinges 710 that couple the outer body portion 704 to the inner body portion 706. For ease of viewing, the outlines of the hinges are shown using dashed lines. As shown in FIG. 7, each flexural hinge 710 has a curved shape that extends substantially around the inner body portion 706. Moreover, both ends 711, 713 of each hinge 710 increase in width (where width is measured along the radial direction) toward the middle portion of the hinge 710. Each end of a hinge 710 overlaps in a radially direction an end of an adjacent hinge. Similarly, the elongated gaps 708 separating the hinges 710 also have shapes that are narrow at both ends and wider at their middle. Additionally, the portion of the ends 711, 713 that integrally connect with the inner body portion 706 and the outer body portion 704 are much longer (as measured in the azimuthal direction) than the free-standing middle portion 715.

Figure 8:
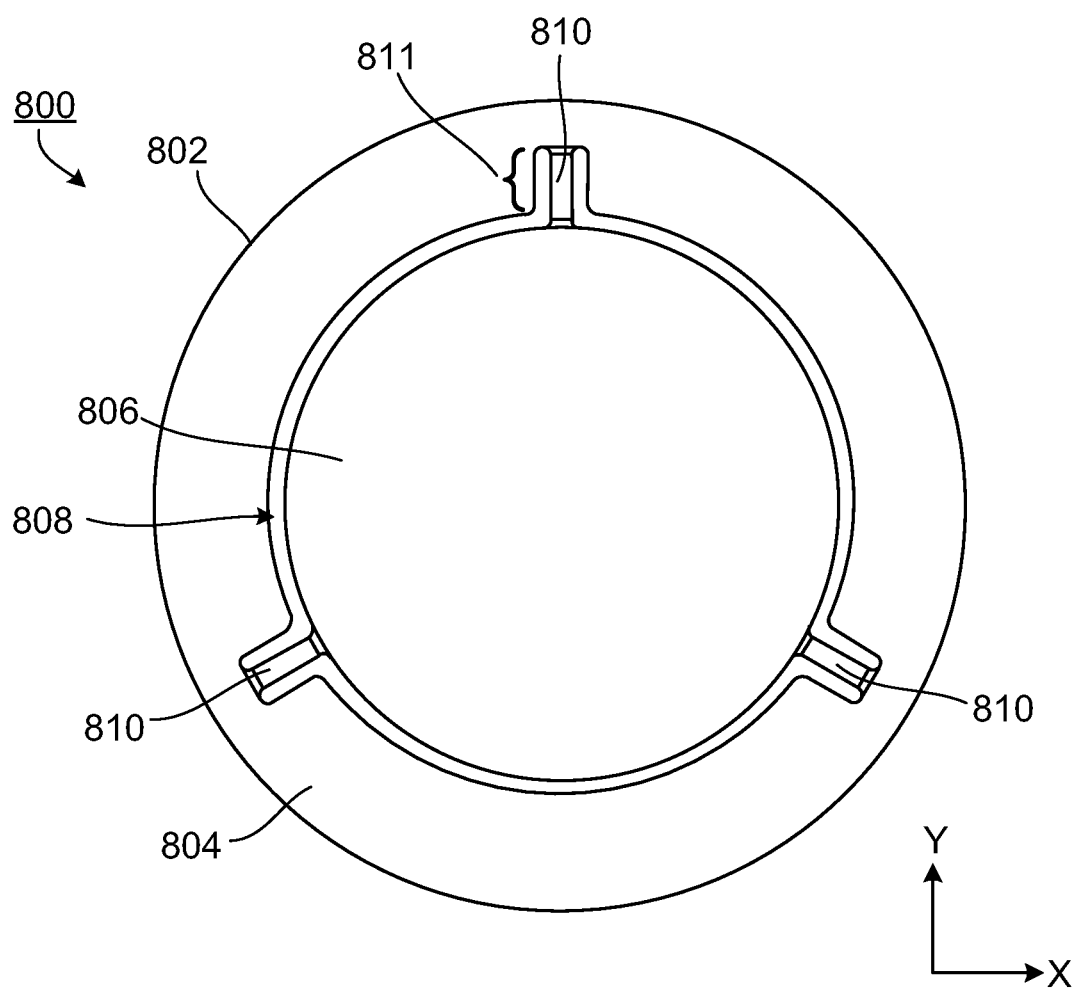
FIG. 8 is a schematic illustrating a plan view of a stress-reducing optical element having integrated flexural hinges.

Optical elements including integrated flexures can have other designs as well. For example, in some implementations, an elongated side of a radially oriented flexural hinge can extend substantially into the outer body portion. An example of that design is shown in FIG. 8. FIG. 8 is a schematic illustrating a plan view of an example of an optical element 800 that includes a monolithic body portion 802 having an outer body portion 804, an inner body portion 806, three flexural hinges 810 connecting the outer body portion 804 to the inner body portion 806, and elongated gaps 808. The elongated portion of each flexural hinge 810 is aligned radially with respect to a geometric center of the monolithic body portion 802. As shown in FIG. 8, the outer body portion 804 must be large enough to accommodate the length 811 of the flexural hinges 810. Furthermore, substantially more material must be removed from the outer body portion 804 compared to the radial flexural hinge design of FIG. 1A or the tangential hinge design of FIG. 5A.

Figure 9:
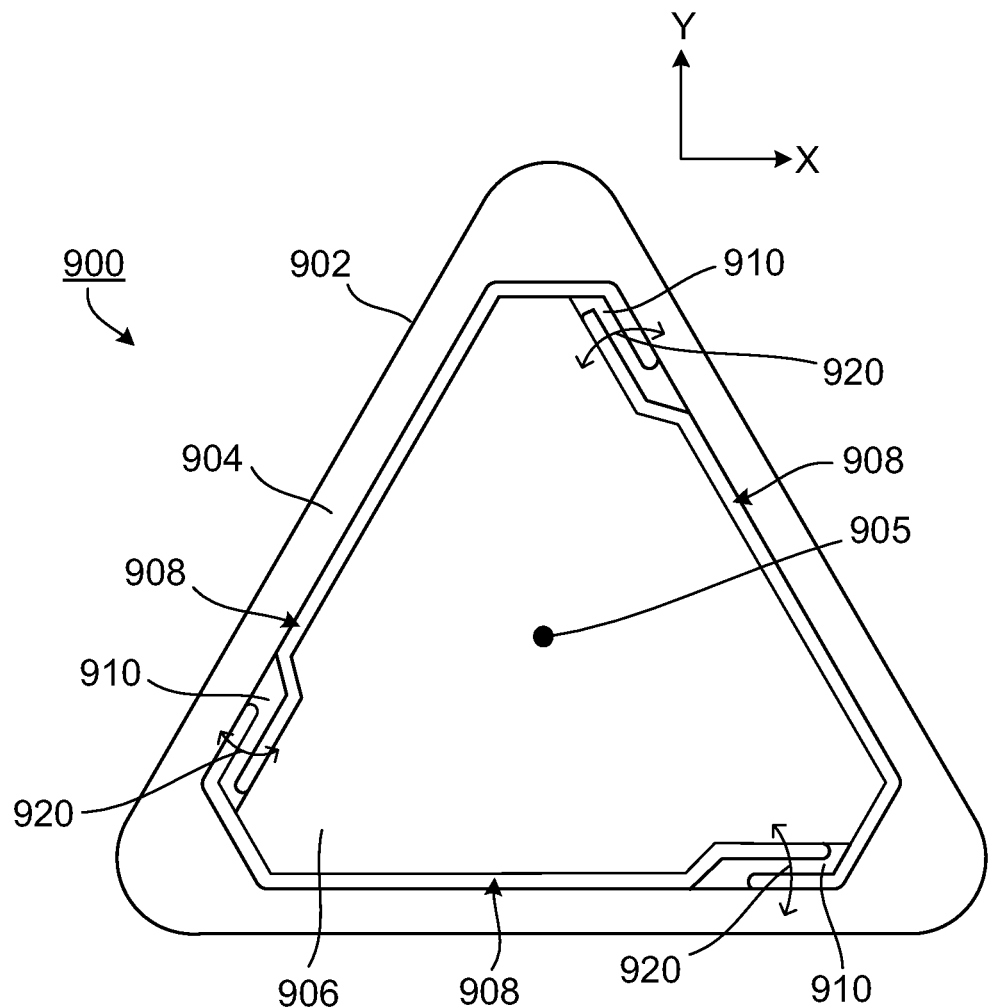
FIG. 9 is a schematic illustrating a plan view of a stress-reducing optical element having integrated flexural hinges.

The foregoing implementations include optical elements having generally circular shapes. However, the optical elements are not limited to circular designs. Instead, the design of the optical elements, including the inner and/or outer body portions, can have other non-circular shapes. FIG. 9 is a schematic illustrating a plan view of an example of an optical element 900 having a monolithic body portion 902 that is triangular in shape. The monolithic body portion 902 includes an outer body portion 904, an inner body portion 906, three flexural hinges 910 connecting the outer body portion 904 to the inner body portion 906, and elongated gaps 908. The flexural hinges 910 are arranged at equidistant points from one another around an approximately geometric center 905 of the monolithic body portion 902. The flexural hinges 910 exhibit a cantilever-like motion when subjected to force applied from the outer body portion 904 or from the inner body portion 906. For example, the hinges 910 are relatively compliant with respect to the outer body portion 904 in the direction of arrows 920 and along the z-direction, but are relatively stiff in a direction of an axis parallel with the elongated side of the hinge. As a result, the inner body portion 906 is constrained to a small amount of tip, tilt, or z-direction motion. In contrast to the implementations shown in FIGS. 1A and 5, the flexural hinges 910 are oriented between a radial and tangential configuration with respect to the center 905.

Figure 10:
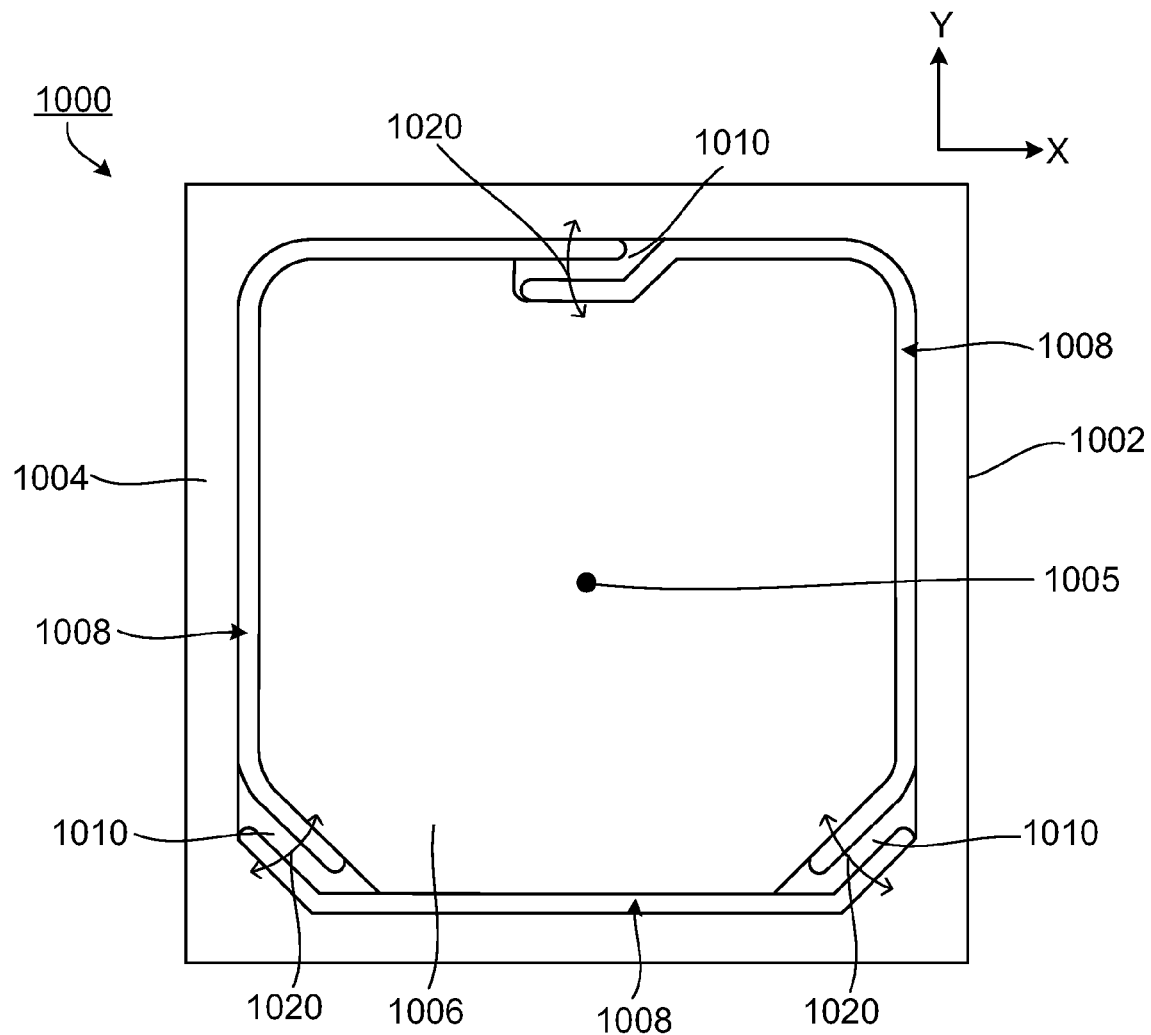
FIG. 10 is a schematic illustrating a plan view of a stress-reducing optical element having integrated flexural hinges.

FIG. 10 is a schematic illustrating a plan view of an optical element 1000 having a monolithic body portion 1002 that is square in shape. The monolithic body portion 1002 includes an outer body portion 1004, an inner body portion 1006, three flexural hinges 1010 connecting the outer body portion 1004 to the inner body portion 1006, and elongated gaps 1008. The flexural hinges 1010 are arranged at equidistant points from one another around an approximately geometric center 1005 of the monolithic body portion 1002. Similar to the hinges 910 shown in FIG. 9, the flexural hinges 1010 exhibit a cantilever-like motion. For example, the hinges 1010 are relatively compliant with respect to the outer body portion 1004 in the direction of arrows 1020 and along the z-direction, but are relatively stiff in a direction of an axis parallel with the elongated side of the hinge. As a result, the inner body portion 1006 is constrained to a small amount of tip, tilt, or z-direction motion. The flexural hinges 1010 are oriented tangentially with respect to the center 1005.

Figure 11:
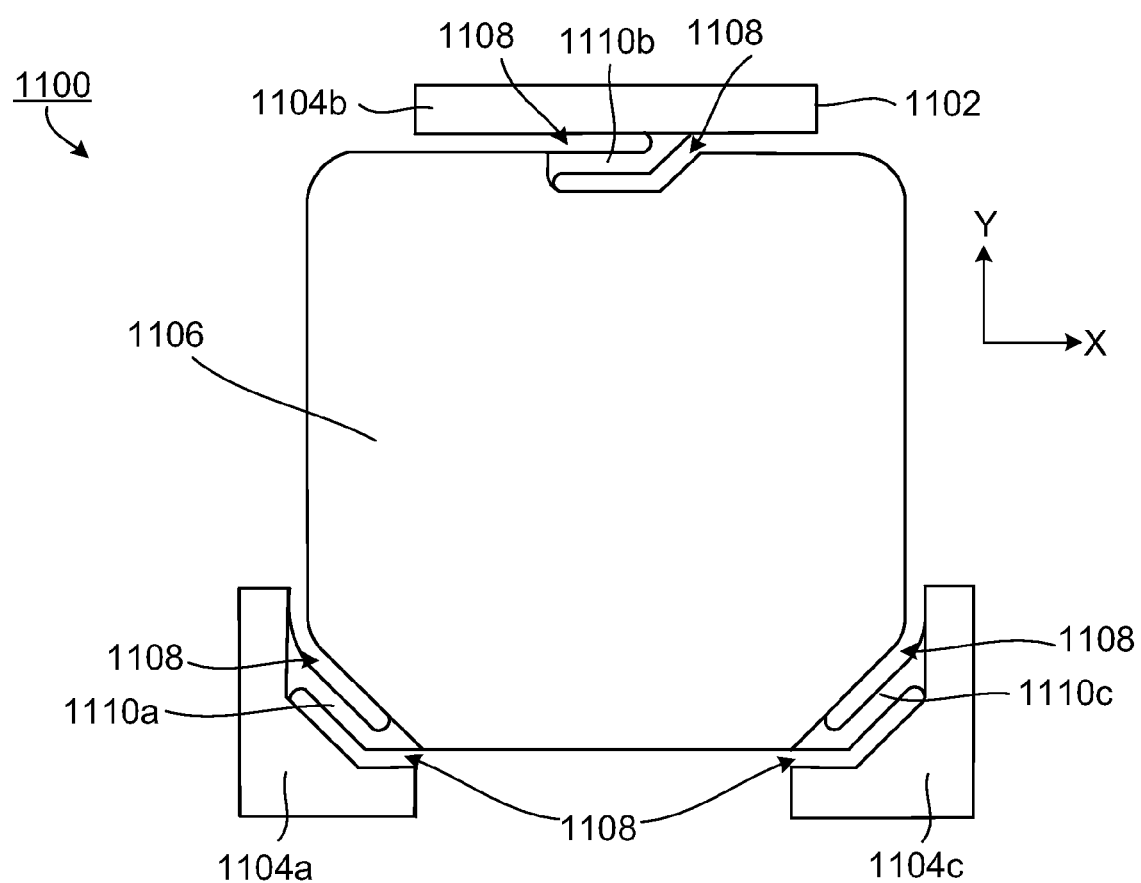
FIG. 11 is a schematic illustrating a plan view of a stress-reducing optical element having integrated flexural hinges.

Though the example designs presented though far have included outer body portions that extend fully around the inner body portion, alternative configurations are also possible in which the outer body portion extends partially around the inner body portion. For example, FIG. 11 is a schematic illustrating a plan view of an example of an optical element 1100 that includes a monolithic body portion 1102 having an inner body portion 1106, an outer body portion including three separate sections 1104a-1104c, and three flexural hinges 1110a-1110c that respectively connect the outer body portion sections 1104a-1104c to the inner body portion 1104. The design shown in FIG. 11 functions in a similar manner to the design of FIG. 10, with the exception that the area of the outer body portion to which a fastener or clamp can be used for mounting the optical element to a mounting substrate has been reduced.

An optical element according to any one of the implementations described herein can be fabricated using computer numerical control (CNC) diamond milling tool in which a diamond-tipped milling tool is used to form the openings in the monolithic body portion. Depending on the desired end design, the hole may extend through the entire thickness of the monolithic body portion or only partially through the thickness of the monolithic body portion. Because the optical elements described herein are formed from a monolithic body portion, no assembly of the optical element is required.

The optical elements described herein can be used in many different applications, especially in high-performance applications, such as in microlithography systems and the projection optical systems therein. The optical elements described herein may also be useful in other high precision applications where resolution and distortion are important with respect to optical performance such as, for example, in wafer/chip inspection tools, as space optics, or as mirrors where optic surface figure might be a significant challenge due to space constraints and/or where weight constraints adversely influence the aspect ratio of thickness to aperture size.

A number of implementations have been described. Nevertheless, it will be understood that various modifications may be made without departing from the spirit and scope of the invention. For example, various stress-reducing optical element designs may be constructed using one or more of the features from any of the implementations described herein. In some implementations, the stress-reducing optical element can include coatings formed on the monolithic body portion to enhance the reflectivity of the optical element. For example, thin films of aluminum, gold, and/or silver can be deposited on the front and/or back surface of the monolithic body portion. In some implementations, multiple thin layers of dielectric material can be deposited on the front and/or back surface of the monolithic body portion to enhance reflectivity. Depending on the thickness, dielectric index, and/or material selected for the layers, the stack can be designed to reflect incident light at one or more desired wavelengths and at different angles. For example, the dielectric stack can be designed to reflect light from a range of wavelengths such as in the visible range (e.g., about 300 nm to about 700 nm), in the ultraviolet range (e.g., about 10 nm to about 300 nm), or in the infrared range (e.g., about 700 nm to about 0.3 mm). Dielectric stacks also can be designed to allow transmission of certain wavelengths of light at different angles as well. Common materials for dielectric stacks include, for example, magnesium fluoride, silicon dioxide, tantalum pentoxide, zinc sulfide, and titanium dioxide. In some implementations, the optical elements described herein may include coatings to minimize reflectance of certain wavelengths of light. The reflective layers and/or dielectric stacks can be deposited using common techniques such as physical vapor deposition, chemical vapor deposition, ion beam deposition, molecular beam epitaxy, and sputter deposition.

Accordingly, other implementations are within the scope of the following claims.

What is claimed is:

1. An optical element comprising a monolithic body portion, the monolithic body portion comprising:
   an inner body portion;
   an outer body portion extending at least partially around the inner body portion; and
   exactly three flexural hinges connecting the inner body portion to the outer body portion,
   wherein one of the inner body portion and the outer body portion defines an optically active portion configured to reflect, refract, or diffract light, and the other of the inner body portion and the outer body portion defines a mount portion, and
   wherein the outer body portion comprises a shelf portion integrally coupled to a first hinge of the three flexural hinges and/or the inner body portion comprises an overhang portion integrally coupled to the first hinge of the three flexural hinges.

2. The optical element of claim 1, wherein the exactly three flexural hinges enable the mount portion to be mounted to another part without degrading the optical performance of the optically active portion.

3. The optical element of claim 1, wherein the inner body portion is the optically active portion, and the optically active portion is a mirror.

4. The optical element of claim 1, wherein at least one flexural hinge extends substantially along a tangential direction with respect to the geometric center of the monolithic body portion.

5. The optical element of claim 4, wherein at least one flexural hinge extends along a direction within about 30 degrees of the tangential direction.

6. The optical element of claim 1, wherein the inner body portion has a circular shape.

7. The optical element of claim 1, wherein the inner body portion has a non-circular shape.

8. The optical mount of claim 1, wherein at least one flexural hinge is separated from an adjacent flexural hinge by a gap between the inner body portion and the outer body portion.

9. The optical element of claim 8, wherein the at least one flexural hinge and the gap are arcuate in shape.

10. The optical element of claim 9, wherein the gap has an arc length longer than an arc length of at least one of the flexural hinges.

11. The optical element of claim 8, wherein each gap extends through a thickness of the monolithic body portion from a first surface of the monolithic body portion to an opposite second surface of the monolithic body portion.

12. The optical element of claim 8, wherein each flexural hinge is separated from an adjacent flexural hinge by a gap between the inner body portion and the outer body portion, each gap has a first end portion and an opposite second end portion, and the first end portion of a first gap overlaps the second end portion of an adjacent gap in a radial direction.

13. The optical element of claim 12, wherein at least one of the flexural hinges is located between the first end portion of the first gap and the second end portion of the adjacent gap.

14. The optical element of claim 13, wherein a thickness of the at least one flexural hinge between the first end portion and the second portion is less than a thickness of the inner body portion and less than a thickness of the outer body portion.

15. The optical element of claim 14, wherein a top surface of the at least one flexural hinge between the first end portion and the second end portion is recessed with respect to top surfaces of the inner body portion and the outer body portion, and a bottom surface of the at least one first flexural hinge between the first end portion and the second end portion is recessed with respect to bottom surfaces of the inner body portion and the outer body portion.

16. The optical element of claim 1, wherein each of the exactly three flexural hinges extends substantially along a radial direction with respect to the geometric center of the monolithic body portion.

17. The optical element of claim 1, wherein at least one flexural hinge has a thickness that is less than a thickness of the monolithic body portion.

18. The optical element of claim 1, wherein a thickness of the monolithic body portion decreases or increases along a radial direction from a geometric center of the monolithic body portion.

19. The optical element of claim 1, wherein the monolithic body portion is made of a material selected from the group consisting of: glass, metal, glass-ceramic matrix, ceramic, quartz, silicon, germanium, and beryllium.

20. The optical element of claim 1, wherein the optically active portion is a lens.

21. The optical element of claim 1, wherein the optically active portion is a mirror.

22. The optical element of claim 1, wherein the optical element further comprises a reflective layer on the monolithic body portion.

23. The optical element of claim 22, wherein the reflective layer comprises multiple layers.

24. The optical element of claim 1, wherein an aperture is located at a center of the inner body portion.

25. The optical element of claim 1, wherein the outer body portion comprises three separate sections, each section connected to a corresponding flexural hinge.

* * * * *